(12) United States Patent
Coffey

(10) Patent No.: US 7,007,075 B1
(45) Date of Patent: Feb. 28, 2006

(54) FLEXIBLE COMPUTER RESOURCE MANAGER

(75) Inventor: John Coffey, Ft. Lauderdale, FL (US)

(73) Assignee: e-Lysium Transaction Systems Inc., Hollywood, FL (US)

( * ) Notice: Subject to any disclaimer, the term of this patent is extended or adjusted under 35 U.S.C. 154(b) by 696 days.

(21) Appl. No.: 09/457,653

(22) Filed: Dec. 9, 1999

Related U.S. Application Data

(60) Provisional application No. 60/111,550, filed on Dec. 9, 1998.

(51) Int. Cl.
*G06F 15/16* (2006.01)

(52) U.S. Cl. ......................................... 709/219; 707/10

(58) Field of Classification Search ................ 709/223, 709/225, 219; 707/103, 10; 379/221
See application file for complete search history.

(56) References Cited

U.S. PATENT DOCUMENTS 4,896,319 A * 1/1990 Lidinsky et al. ............ 370/427
6,122,639 A * 9/2000 Babu et al. ............. 707/103 R
6,314,425 B1 * 11/2001 Serbinis et al. ............... 707/10
6,415,027 B1 * 7/2002 Malik ..................... 379/221.01

* cited by examiner

*Primary Examiner*—Larry D. Donaghue
(74) *Attorney, Agent, or Firm*—Gifford, Krass, Groh, Sprinkle, Anderson & Citkowski, P.C.

(57) ABSTRACT

A Flexible Resource Manager, or FRM, enables multiple clients to share disparate resources, including database connections, communication ports and tasks for multiple clients. The approach balances performance issues, such as the latency introduced by resource allocation, with the overhead of retaining unused resources, while providing for demand-based allocation, reuse of already allocated resources, and removal of resources under the control of an aging parameter. During registration, each resource object class and its corresponding constructor parameters are stored, and a resource pool is configured to contain a maximum and minimum number of instances. When registration completes, the FRM returns back a unique identifier that the application can use request instances of these resources in the future. Drivers or other dependent resources supporting the managed resource are only loaded when needed, thereby conserving memory and processing overhead.

12 Claims, 3 Drawing Sheets

FLEXIBLE COMPUTER RESOURCE MANAGER

REFERENCE TO RELATED APPLICATION

This application claims priority of U.S. provisional application Ser. No. 60/111,550, filed Dec. 9, 1998, the entire contents of which are incorporated herein by reference.

FIELD OF THE INVENTION

This invention relates generally to computer network architectures, and, in particular, to an improved resource management configuration.

BACKGROUND OF THE INVENTION

Effective resource management is essential to an efficient computing environment. Many resource management techniques have been attempted and implemented, but each approach suffers due to trade-offs in terms of throughput and flexibility. Traditional approaches include homogeneous resource management, which has the drawback that only one type of resource may be managed at a given time. Existing approaches also include static allocation, which allocates resources prior to their use. However, this may consume valuable memory resources when, in fact, such resources may not actually be required by a program.

More advanced techniques make use of threads. Threads are a time-sharing facility used in modem multi-tasking operating systems and programming languages to make programs appear more responsive. Using multiple threads, a program can appear to perform multiple tasks at the same time.

Threading comes in two main types, namely, pre-emptive and co-operative. With pre-emptive threading, the operating system is responsible for allocating CPU time to each thread, whereas, with co-operative, a thread is responsible for yielding its time slice to the operating system. In both cases, when a thread needs to wait for a very slow resource compared to the CPU (like reading a block of data from a disk), the operating system automatically yields the CPU to another thread that is more able to perform work and this makes the system more responsive. When a multi-threaded program accesses shared or common data, it is extremely important that access to this shared data is serialized. Failure to serialize could be problematic as one thread may be in the middle of an update while another thread pre-empts this thread. The thread that takes over will have the shared data in an unknown state.

Certain existing resource management configurations utilize a single resource instance which is shared between all threads. A typical system based on this basic approach is performance limited, however, since only one thread can access the resource at any time. Serialized access to the resource needs to be implemented by the resource. This makes scaleable resource development considerably more complex and prone to deadlock situations that are extremely difficult to track down and fix. As an alternative, resources may be explicitly allocated per client application thread. In the traditional approach, however, each thread experiences the overhead of a new resource allocation rather than the resource being shared/reused by multiple clients.

A further option is based upon a decentralized management of resources. In this case, resource failure is handled on a per-resource basis, rather than by the resource manager, and resource limitations are handled by application logic rather than being treated transparently.

SUMMARY OF THE INVENTION

The subject invention improves upon existing resource management techniques by providing an intelligent, multi-threaded component called the Flexible Resource Manager, or FRM, which facilitates thread-safe access to shared resources for multiple clients. During registration, each resource object class and its corresponding constructor parameters are stored, and a resource pool is configured to contain a maximum and minimum number of instances. When registration completes, the FRM returns back a unique identifier that the application can use request instances of these resources in the future. Drivers or other dependent resources supporting the managed resource are only loaded when needed, thereby conserving memory and processing overhead.

The invention provides simultaneous management of disparate resources, such as database connections, communication ports and threaded tasks. The approach balances performance issues, such as the latency introduced by resource allocation, with the overhead of retaining unused resources, while providing for demand-based allocation, reuse of already allocated resources, and removal of resources under the control of an aging parameter.

DETAILED DESCRIPTION OF THE INVENTION

The flexible resource manager ("FRM") according to the invention is an intelligent, multithreaded component that provides thread-safe access to shared resources for multiple clients. The component is responsible for managing access to all Shared Resource objects. There is only one instance of the resource manager per process, since it is implemented as a singleton object. This ensures that the resource manager controls access to all resources that have been registered in the process. The approach offers certain distinct advantages, including:

Support for Multiple Resource Types

Any resource which inherits from the SharedResource abstract class can be managed by the FRM. The client simply supplies the class name of the resource along with any necessary parameters (e.g., username/password in the case of a database resource). In this way, any client can register to use any resource class at any time.

Allocation on Demand

The FRM only allocates resources when absolutely required. The technique therefore implements a "lazy" allocation where resources are only allotted when explicitly requested by client programs. Drivers or other dependent resources supporting the managed resource are only loaded when needed, conserving memory and processing overhead.

Thread Safe Access to Resources

Application programmers that program to the resource manager API need not be concerned about resource serialization issues.

Resource Recycling

Resources are also recycled when not in use. This saves considerable allocation and initialization time, which is particularly useful for database resources.

Resource Failure Management

Since it is possible to have resources fail during their life cycle, the resource manager handles the most severe of these cases for the client application. Most resources inherit from the SharedResource abstract base class. This provides code to handle resource unlocking and destruction.

Resource Limitations

The resource manager can optionally limit the maximum number of allocated resources in a program. This limit may be imposed by third party software limitations (connection licenses to a database), or by hardware limitations where available memory may be a limiting factor.

Resource Allocation Hiding

The resource manager takes care of resource instance construction and serializing access to the resources at run time. This makes scaleable resources simpler in design and more available for thread safe concurrent access.

Adaptive Technology

Adaptive timing algorithm to calculate the optimal aging period per registered resource type based on statistical resource usage.

Independent Resource Management

Each resource is independently managed in its own resource pool.

How the System Works

Figure 1:
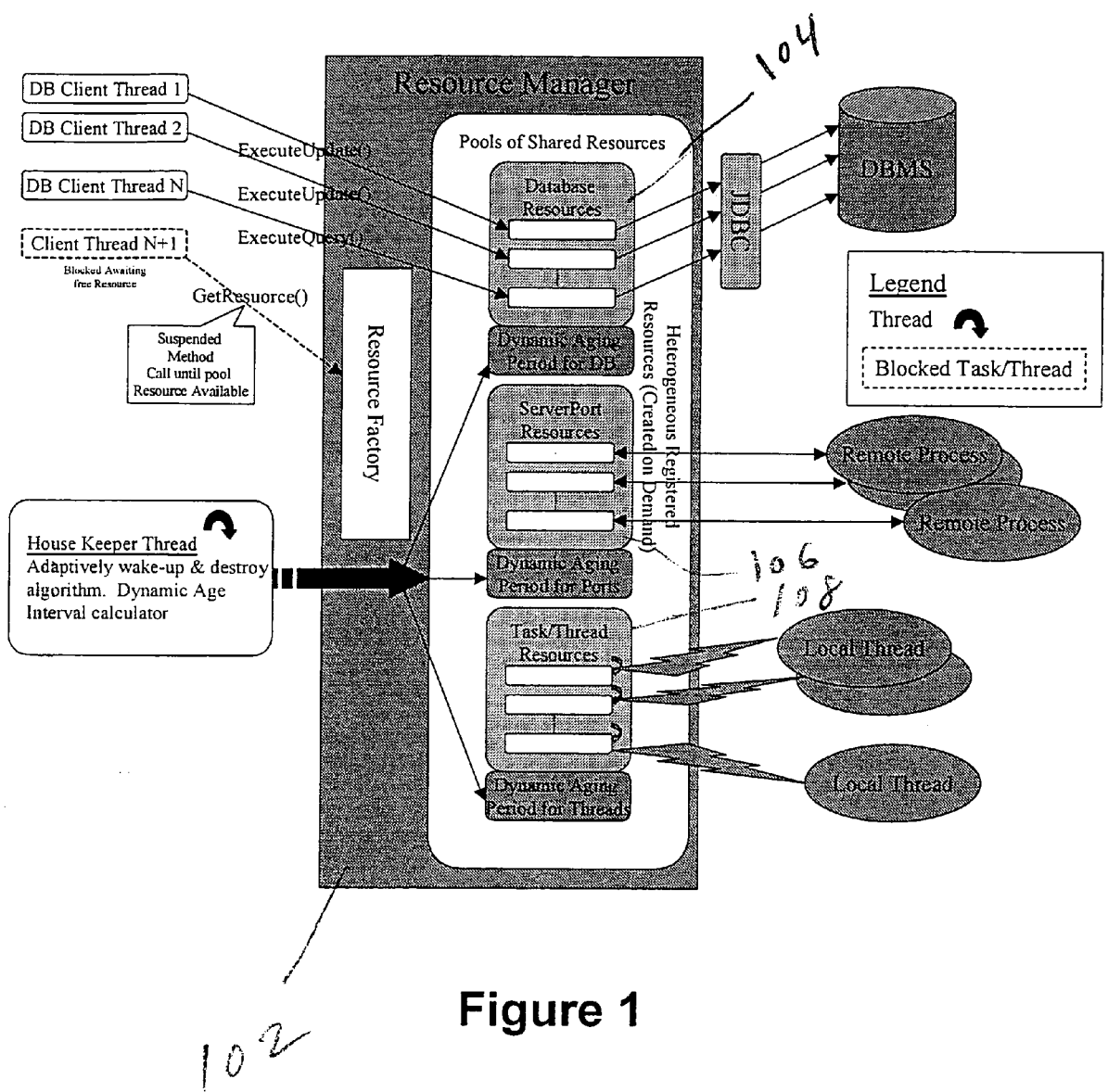
FIG. 1 is a diagram which shows how objects are arranged within the inventive flexible resource manager (FRM)

FIG. 1 shows objects arranged within the FRM (12). The FRM 102 is essentially an intelligent container of resources such as database resources 104, serverport resources 106 and task/thread resources 108. Each resource object class and its corresponding construction parameters are registered with the FRM. During registration, the FRM allocates an empty pool for managing each resource separately. When registration completes, the FRM returns back a unique identifier that the application can use request instances of these resources in the future. During the resource registration process, each resource pool is configured to contain a maximum and minimum number of resources.

FIG. 1 shows an example where the FRM 102 manages three resource types. In this particular example the resources include a database resource 104 for communicating with a DBMS, a server port resource 106 for communicating with external processes via TCP/IP and a task resource 108 for performing a specific task for a client. Note that if a client wishes to communicate with another database, this will be managed as a separate pool within the FRM. This is due to the fact that the construction parameters, which are specific to the database resource, are distinct (for example, by the login name/password), and this results in a distinct resource identifier for the client thread or application.

To show how the FRM is used, consider a typical example where several clients use a web browser to communicate with a single database located near within the web server. Assume that the web server registers a database resource with the FRM. This registration includes the Shared Resource class name (DBResource) and its construction parameters. These include the username, password, database-driver and data source name. The FRM creates no DBResource instances at this time. The registration will also include a maximum number of resources to manage with its pool.

Figure 2:
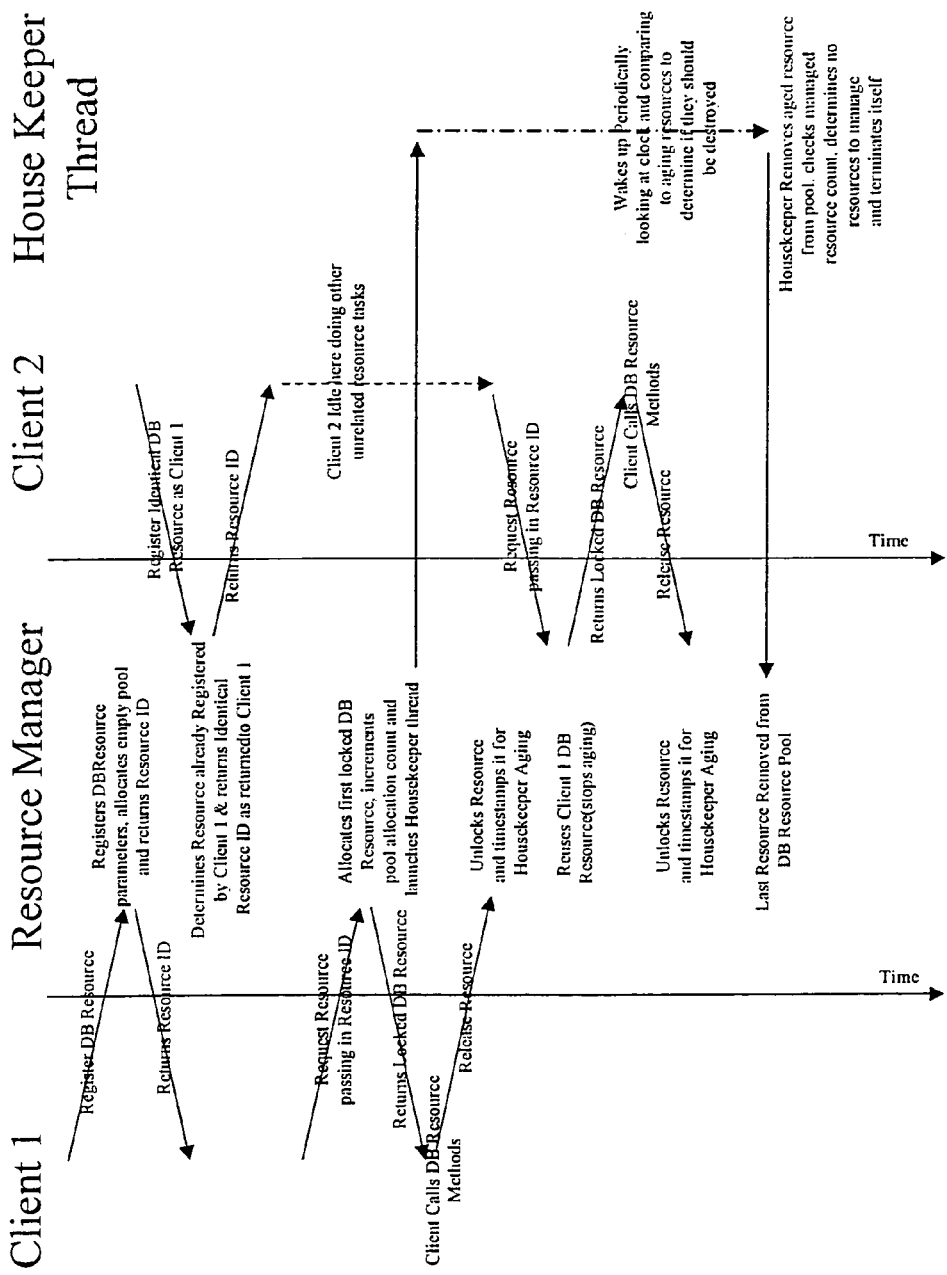
FIG. 2 is a diagram which demonstrates a dynamic example of the FRM.

FIG. 2 demonstrates a dynamic example of the FRM. In this example, two client threads share an identically registered database resource. This would be the case of both threads were communicating with an identical database. Note that the identical resource ID and the actual database resource instance are reused by thread 2. The same resource may be reused because client 1 returned the resource to the resource manager's pool prior to client 2 requesting a resource. This means that the resource was still allocated, but aging. If the second client requests a resource while the first client is using it, then an additional resource will be allocated by the FRM.

As soon as the first web database request arrives at the web server, the web server launches a thread that processes the request. This thread will request a database resource from the FRM. Since this is the first time a resource is requested from the FRM, it will construct one, add it to the database resource pool and mark it as unavailable for other threads. The resource is then passed back to the thread where it can be used to query or update the database.

Assuming these queries take a considerable time to complete, subsequent web requests will create concurrent threads that also request database resources. As explained above, since the existing resource is used by another thread and therefore is locked servicing a database request, the FRM will allocate additional resources unless the maximum resource limit is reached. If the maximum registered resource limit is reached, incoming threads requesting database resources will be blocked until a resource is released by another thread.

Operations on Resources

To further illustrate the operation of the FRM, the life cycle of a shared resource is described in the sections below. During normal processing, the locking, usage and unlocking phases are most frequently used. During the unlocked phase, the FRM is free to reallocate resources as it sees fit.

Resource Registration

The registerResourceClass method is used to register a new instance of a resource with the FRM. If this resource was already registered for some reason, the handle associated with the first registration will be re-used.

Registration involves passing in a fully qualified resource class name, construction parameters and an upper resource limit that will be used to construct resource instances when required. During the registration process, the parameters are validated and stored in an internal database. No resource instances are created at this time. The time-consuming instance creation is delegated to the first usage access.

During registration, the application also indicates the maximum and minimum number of resource instances that the FRM should manage. This is particularly important for database and thread resources, since the limiting factors may be connection licenses or hardware (typically memory).

Typically, applications will pre-register all of their instances statically at program startup. At times, however, pre-registered resource types may not be required, since their use may be determined at run time. The delegation model used by the FRM ensures that the object count and memory requirements are minimized while the programming interface remains substantially open.

An alternative way of registering resources makes use of a mechanism called 'register by example.' This technique requires a sample class instance with introspectable properties (much like a Java Bean). The idea is that the client program allocates a sample instance, set some required properties that they would like cloned later (like the database name to communicate to etc.), and then register this with the FRM. The FRM then introspects the properties, verifies whether the FRM can manage the class, and stores the class template with the associated pool information along with the constructor construction parameters. Subsequently, when additional instances are needed, the FRM can use the registered information to construct and lock these additional instances.

Resource Acquisition and Locking

This is where a specific pre-registered resource instance is returned to the client application. The getResource method implements this phase of the lifecycle. This may involve either constructing a new instance of the resource or alternatively reusing an unused (still active) resource from a resource pool. During registration, all the information required to create new resources is stored in an internal database within the resource manager. The getResource method eventually returns a locked resource object to the application. Resource locking is required so that resource specific state information cannot be corrupted by inadvertent access to this resource instance by other threads or processes. To acquire a specific resource, the client application needs to indicate the registration identifier returned from registerResourceClass.

Resource Usage

This is where the resource specific operations are called. The Resource must be locked in for its methods to be used.

Resource Unlocking

For the successful use of the resources, it is essential that the unlocking leaves no state information in the resource that the client thread depends upon. After the resource is unlocked, the object is not deleted from memory. Instead a snapshot of the current time is noted at release time and stored with each object in the pool. The housekeeper asynchronously monitors the age of each resource.

Removing Resource Registration

This is where the registered resource pool is removed from the FRM. All resources of this type instances are removed from the resource pool. The FRM explicitly unlocks any locked resources. These will be removed from memory provided there are no explicit object references in client threads.

Representative Applications

Database Resources

Reuse and aging of resources is particularly valuable in the case of database resources, which have heavy latencies and database server overhead.

Socket Resources

Socket resources may be used to make client server connections with other with remote devices. One of the goals behind managing these resources is to push data from the Servlet to the Applet.

Task Resources

These resources resemble a task pool in a workflow system. All tasks in this pool would be idle until they were dispatched a unit of work to do. Since these task resources are implemented as sleeping threads, the start up time would be very fast during a burst of activity. Additionally, due to the possibilities of limiting the number of active instances in the system, managing these Task Resources makes the maximum load deterministic.

Business Partner Applet

Figure 3:
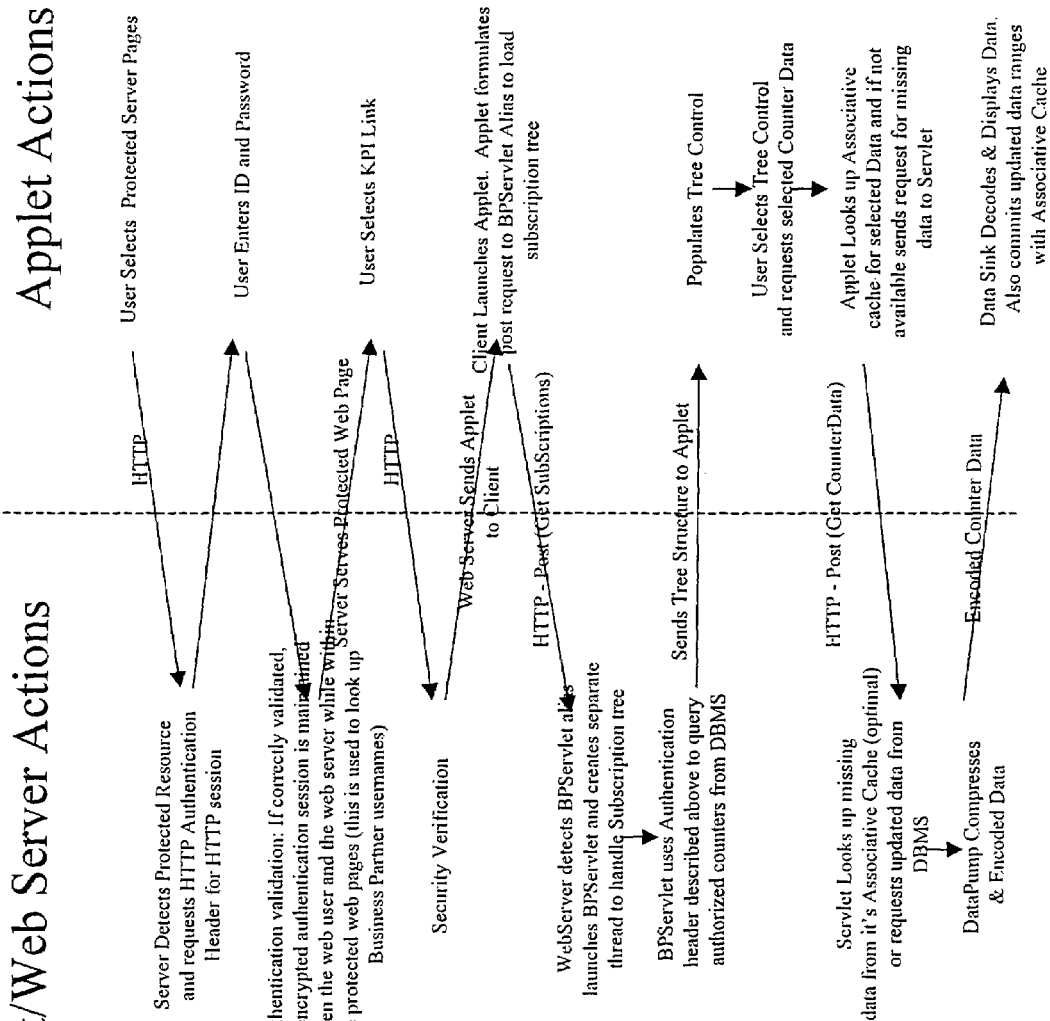
FIG. 3 shows how a Java applet integrates with a Servlet as part of a web partner implementation of the invention.

The FRM may also be used in the marshalling of data from counters (e.g., the performance of telephony or e-commerce services for a business partner being hosted on transaction management software, including the type described in co-pending U.S. patent application Ser. No. 09/256,540, now ABN, which is incorporated herein by reference in its entirety. FIG. 3 shows how a Java applet integrates with a Servlet. Once the user opens the page containing the applet, the Java Web Server downloads the applet to the client desktop. Once the applet is successfully loaded, the init method is called. This launches a worker thread that implements an appropriate Client-Server protocol between the applet and the Servlet's doPost method.

Once securely logged in, the Java Web Server maintains a cookie session identifier in the form of an Authorization header between the applet and the Servlet. Using this header, the Servlet identifies the business partner associated with a particular HTTP request. This authorization identifies the business partner as the owner of a database connection resource and a pool of cached counter data.

As business partners log on and off, they are allocated a new or reused database connection. Allocations only occur if all resources are currently in use. The housekeeper thread closes extra connections when they are no longer in use after a configurable aging interval. If a new business partner logs on before this aging interval has expired, she will be given the connection that was released by the last business partner to log out.

I claim:

1. In a computer network architecture, a method of managing resources shared among clients, comprising the steps of:
   receiving a request from a client to register a resource;
   storing, in a database, all information required to create the resource, including the object class and construction parameters associated with the resource; and
   returning a unique identifier that each client can use to request instances of the registered resource.

2. The method of claim 1, wherein:
   drivers or other dependent resources associated with a managed resource are loaded on an as-needed basis, thereby conserving memory and processing overhead.

3. The method of claim 1, further including the step of allocating an empty pool for registered resources so that the registered resources may be managed separately.

4. The method of claim 3, wherein each resource pool is configured to contain a maximum and minimum number of resources.

5. The method of claim 1, wherein the clients request the resources over the Internet using web browser for communication purposes.

6. The method of claim 1, wherein the resources include database resources, serverport resources, or task/thread resources.

7. The method of claim 6, wherein:
the resource is a database resource, and
the registration includes some or all of the following construction parameters: username, password, database-driver, and data source name.

8. The method of claim 1, further including the steps of:
specifying a maximum resource limit; and
allocating additional resources unless the maximum resource limit is reached, at which time incoming resource requests are blocked until a resource is released.

9. A method of computer resource management, comprising the steps of:
registering a resource in conjunction with a first client application thread, and returning a resource identification to the first client thread;
receiving additional requests to register the same resource, and returning the identical resource identification in each case; and
instantiating the resource only when actually used.

10. The method of claim 9, wherein:
the registration of a resource involves passing a class name, construction parameters and an upper resource limit; and blocking additional requests of the resource if the resource limit usage is exceeded.

11. The method of claim 9, wherein:
the resources are shared over the internet, and the clients use web browsers.

12. The method of claim 9, wherein:
the resource is a database resource, and the registration includes some or all of the following parameters: username, password, database-driver, and data source name.

* * * * *